March 28, 1961  G. O. BARTOO  2,976,555
WINDSHIELD WIPER MOTOR TRANSMISSION SYSTEM
Filed March 18, 1957  3 Sheets-Sheet 1
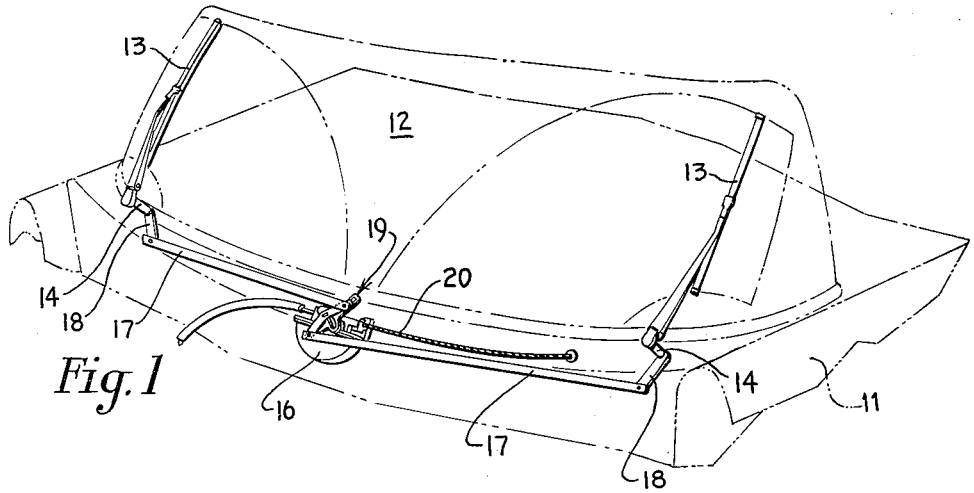
Fig. 1
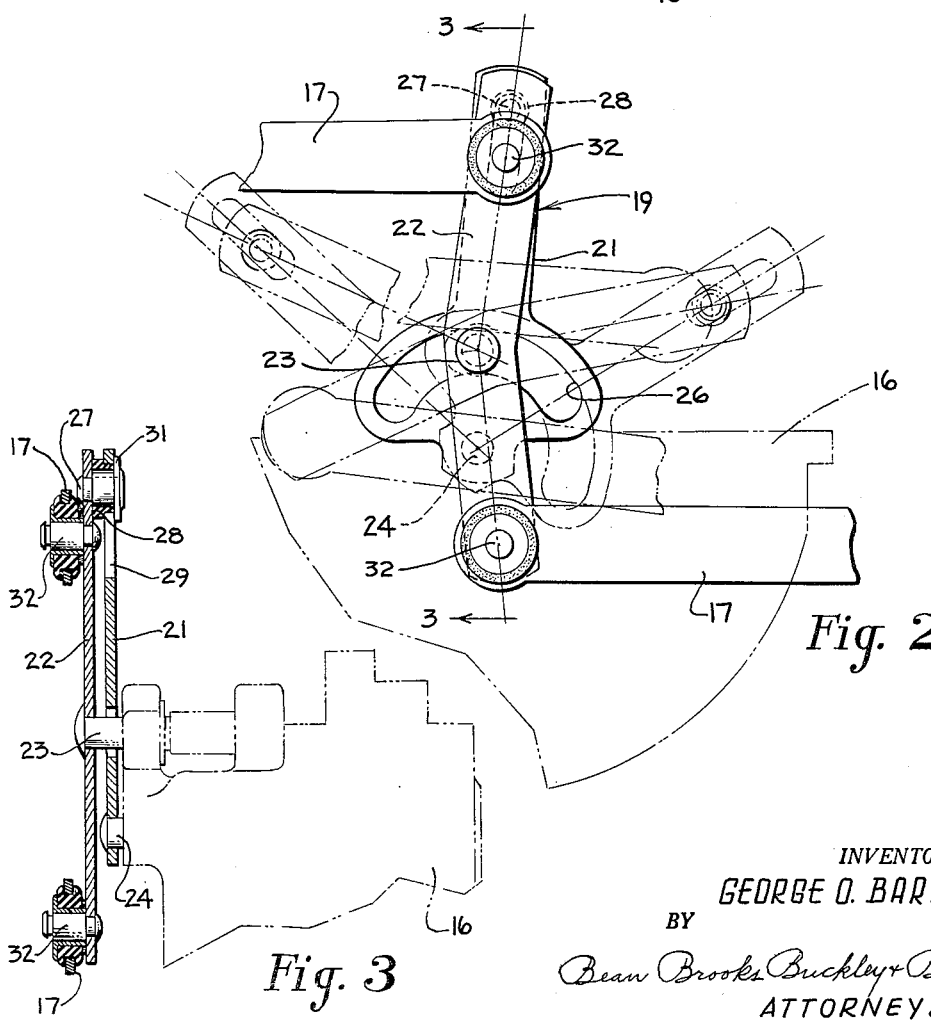
Fig. 2
Fig. 3
INVENTOR.
GEORGE O. BARTOO
BY
Bean Brooks Buckley & Bean
ATTORNEYS March 28, 1961 G. O. BARTOO 2,976,555
WINDSHIELD WIPER MOTOR TRANSMISSION SYSTEM
Filed March 18, 1957 3 Sheets-Sheet 2

INVENTOR.
GEORGE O. BARTOO
BY
Bean Brooks Buckley & Bean
ATTORNEYS

March 28, 1961    G. O. BARTOO    2,976,555
WINDSHIELD WIPER MOTOR TRANSMISSION SYSTEM
Filed March 18, 1957    3 Sheets-Sheet 3

INVENTOR.
GEORGE O. BARTOO
BY
Bean Brooks Buckley & Bean
ATTORNEYS

United States Patent Office 2,976,555
Patented Mar. 28, 1961

2,976,555

WINDSHIELD WIPER MOTOR TRANSMISSION SYSTEM

George O. Bartoo, Eden, N.Y., assignor to Trico Products Corporation, Buffalo, N.Y.

Filed Mar. 18, 1957, Ser. No. 646,780

2 Claims. (Cl. 15—250.27)

This invention relates to windshield wiper arrangements for use on motor vehicles, and more particularly to a windshield wiper motor transmission system.

In the conventional type of wiper motor transmission system, wherein a connecting rod is affixed at one end to a crank mounted upon the wiper motor shaft and at the other end to a crank mounted upon the wiper blade rockshaft, the angular velocity of the wiper blade, as it approaches each end of arcuate travel, does not decrease any appreciable amount. This is because the movement of the connecting rod must occur over that range during which the increments of linear movement, per unit of angular travel of the motor piston, do not decrease rapidly, resulting in little reduction in velocity of wiper blade movement as the wiper blade approaches or recedes from end point of arcuate travel.

In the present invention, a vacuum type operated motor of conventional design, is provided with a new and novel crank assemblage which functions to effect rapid change of connecting rod movement as it approaches or leaves end position of travel. As a result, a great reduction in velocity of wiper blade movement is obtained at end point of arcuate travel thereby providing for improved wiper blade operation and a reduction in high inertia factors and associated stress and strain normally encountered at wiper blade end movement.

In addition, a wiper motor having a crank assemblage according to the principles of the invention, may be applied directly to a wiper drive shaft to obtain decrease in velocity of movement at end point of travel, and also to provide an arcuate travel of 180°.

The main object of this invention is to provide an improved windshield wiper power transmission system.

A further object of this invention is to provide a windshield wiper motor transmission system wherein reduced angular velocity of wiper blade movement is provided in the end zones of wiper travel.

Another object of this invention is to provide a windshield wiper which may be arranged to effect a decrease in wiper blade angular velocity in end positions of travel, and also to provide up to 180° of arcuate travel.

A further object of the invention is to provide a windshield wiper transmission arranged for applying a greater leverage in the transmission of motion as the mechanism approaches its end position of operation. There are many conditions when this is desirable, such as in overcoming snow pack beyond the end of the blade movement, providing extra power to lift up the wiper blades out of their extreme position around the side or ends of the windshield, and also for the acceleration of the windshield wiper arms and blades at the start of each movement from the end of the blade travel.

These and further objects and features of the invention will become more apparent from the following description and the accompanying drawings wherein:

Fig. 1 is a fragmentary perspective view of a motor vehicle having a windshield wiper motor transmission system embodying the principles of the invention;

Fig. 2 is an enlarged view illustrating a connecting rod linkage arrangement used in the system illustrated in Fig. 1;

Fig. 3 is a section view as seen from line 3—3 in Fig. 2;

Figure 4:
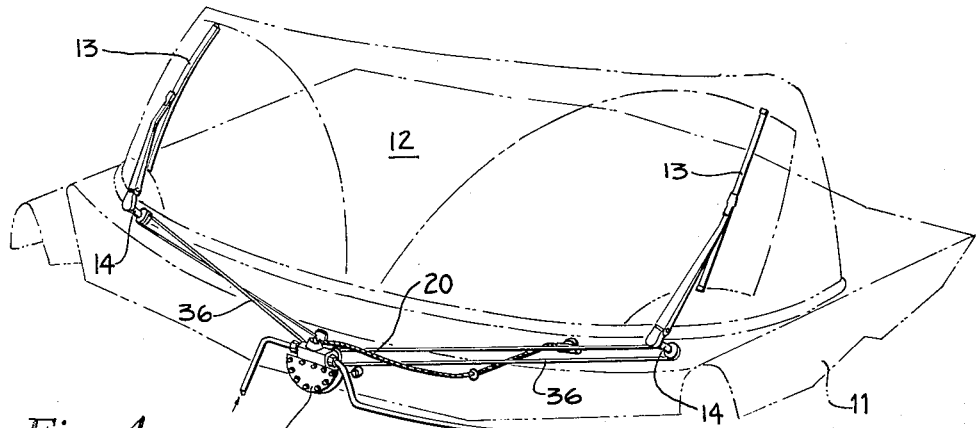
Fig. 4 is a view illustrating a linkage arrangement embodying the principles of the invention, and as applied to a cable type wiper motor drive system.

Referring now to the drawings and more particularly to Fig. 1, the numeral 11 identifies a motor vehicle having a windshield 12 of the wraparound or panoramic type on which are mounted a pair of wiper blades 13 each of which is supported at its lower end by rockshaft or crankshaft 14 to provide arcuate movement of the blade upon the windshield. A wiper motor 16 mounted upon the firewall in the mid-region of the motor vehicle, is adapted for rotating each crankshaft by way of connecting rods 17 and crankarms 18. A motor control cable in the form of a Bowden wire 20, is arranged for wiper motor operation, in the usual manner.

The motor has a compound linkage asemblage 19 incorporating the principles of the invention, and which consists of a driving lever, or arm, 21 and a driven lever, or arm, 22. The driven lever 22 is affixed at its midpoint to an auxiliary shaft 23 which is mounted upon the wiper motor parallel to motor shaft 24. The driving lever 21 has an arcuate slot 26 arranged to prevent interference with the shaft 23 as the lever 21 is arcuately driven by the motor shaft 24. Affixed to the upper end of the driven lever 22 is a pin 27 supporting a rotatable bushing 28 which is arranged to roll or slide in a slot 29 formed in the driving lever 21. A washer 31, affixed to the end of the pin 27, maintains the bushing 28 within the slot 29. Secured toward each end of the driven lever 22 are pin members 32 each of which rotatably supports an end of a connecting rod 17.

Figure 8:
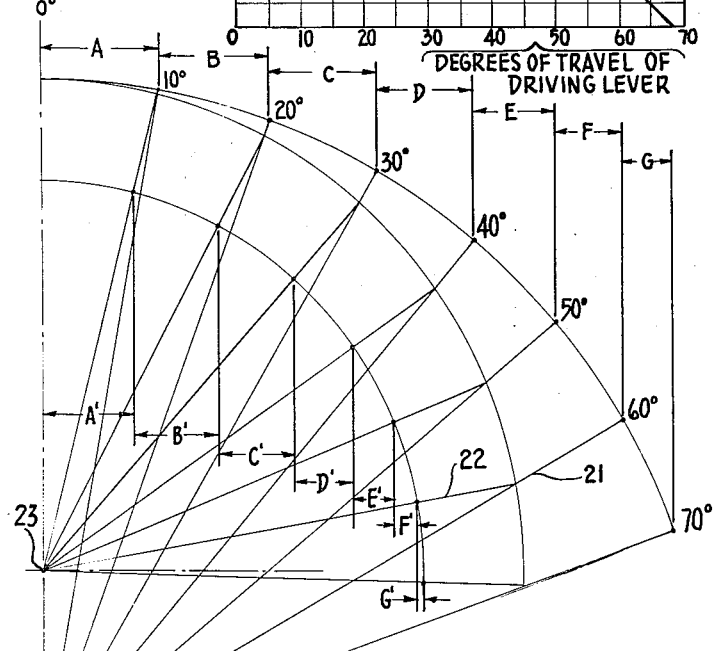
Fig. 8 is a diagram illustrating the relationship between the movement of the driving and driven levers.

From a study of assemblage 19, and the diagram illustrated in Fig. 8, it will be seen that as the driving lever 21 is moved through a given arcuate distance by motor shaft 24, the increments of horizontal components of the movement of the driving lever, namely A to G, will decrease less throughout overall arcuate movement than the corresponding increments of horizontal components of the movement, namely A' to G', of the driven lever 22. As a result, the change in the increments associated with the driven lever 22 will be much greater than the change in the increments associated with the driving lever 21. This is due to the fact that the driven lever operates through a larger angle of movement and comes closer to a 90° position from the vertical mid-position in the end zone of operations. Such a fact is graphically illustrated in Fig. 9, wherein it will be seen that the solid curved line, which represents the velocity of a connecting rod 17 in the horizontal direction, is much steeper in slope than that of the broken curved line, which represents the velocity of the horizontal component of movement associated with the driving lever 21.

Accordingly, the crankarms 18, to which the connecting rods 17 are attached, will be moved at a slower rate as the ends of arcuate travel are approached, so that angular velocity of the wiper blades 13 will be greatly decreased in the regions of end travel. Thus it will be apparent that the change in horizontal component of velocity of a connecting rod 17, from mid-point of travel to end point, is considerably greater than the relative change in horizontal component of velocity of the driving lever, which directly drives a connecting rod in conventional wiper transmission systems.

Figure 9:
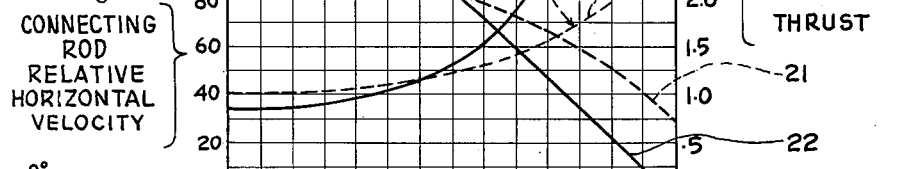
Fig. 9 is a graph illustrating operating characteristics of a wiper transmission system embodying the principles of the invention as compared to a conventional wiper transmission system.

The graph of Fig. 9 also includes curves illustrating the fact that the connecting rod component of relative horizontal thrust of the driven lever 22, rise much more rapidly than the component of horizontal thrust of the driving lever 21. Accordingly, it follows that, toward end positions of movement, the ratio of the resultant torque transmitted by the driven lever, and the thrust transmitted to its connecting rod, as compared to the similar value resident in the driving lever, will increase.

It is to be noted that the centerline of the driven lever 22 may be canted as shown, such canting desirable sometimes to embody more of the effect of this invention during one end position movement than during the other end position movement.

Figure 5:
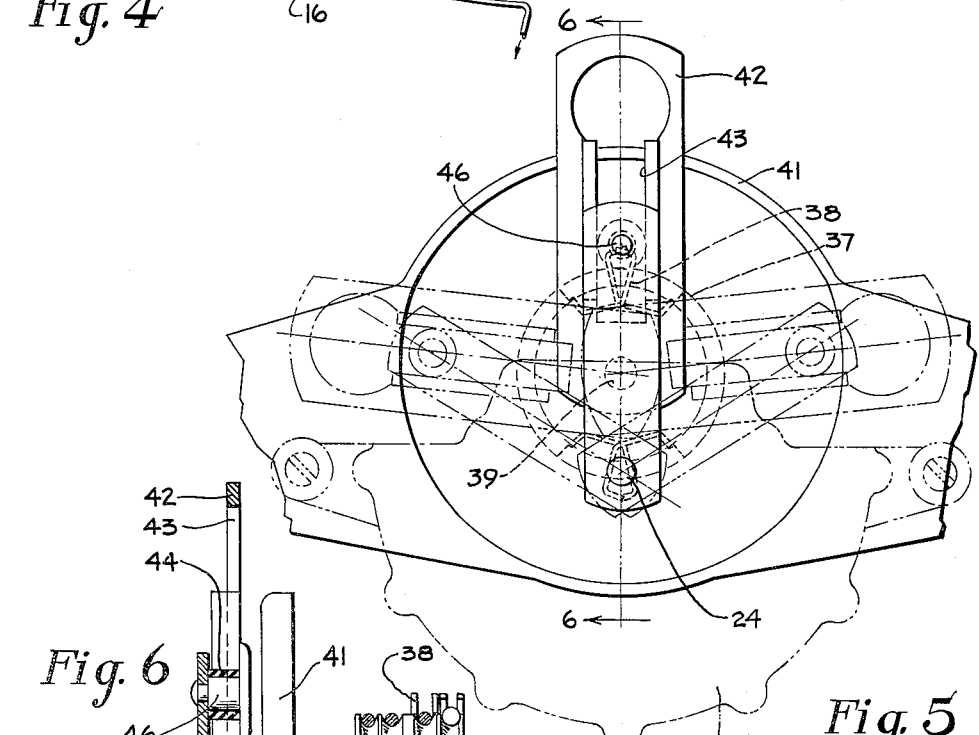
Fig. 5 is an enlarged view of a portion of the linkage arrangement used in the system illustrated in Fig. 4.
Figure 6:
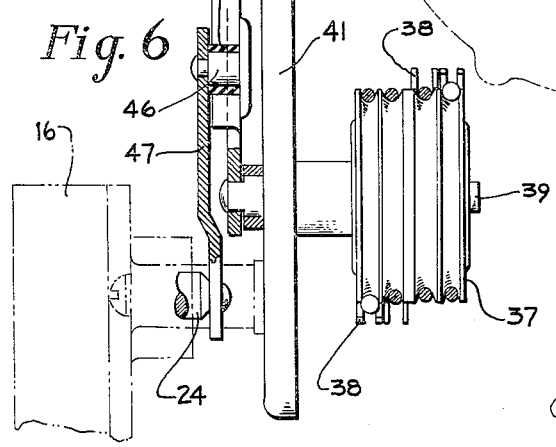
Fig. 6 is a section view as seen from line 6—6 in Fig. 5.

The principles of the invention, as applied to a wiper transmission system employing a flexible cable drive, is illustrated in Figs. 4 to 6. As seen in the drawings, the wiper motor 16 is arranged to drive the wiper crankshafts 14 by means of flexible cables 36 which are connected to a grooved pulley, or drum 37, by way of hooks 38 secured to the pulley. The latter is affixed to a shaft 39 which is rotatably supported in a bracket 41 secured to the vehicle body near the center thereof. Attached to the end of the shaft 39 is a driven lever, or arm, 42 which has a slot 43 slidably receiving a bushing 44 supported on a pin 46 secured to the end of a driving lever, or arm, 47. The opposite end of the driving lever 46 is affixed to the motor shaft 24 of wiper motor 16.

It will be seen that as the driving lever 47 is rotated alternately in opposite directions, the pin and bushing connection will cause rotation of the driven lever 42 by virtue of sliding or rolling connection in the slot 43. As a matter of fact, the proportions of the linkage mechanism illustrated may be varied by changing the distance shown between the shafts 24 and 39, so that the angular velocity of the driven lever at end region of travel could be approximately half of its angular velocity at midpoint of travel (vertical centerline).

Figure 7:
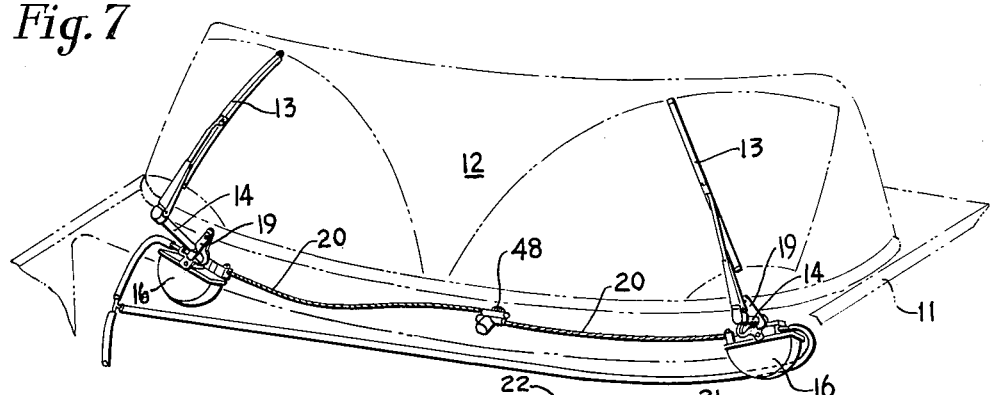
Fig. 7 is a fragmentary perspective view of a motor vehicle having wiper motors embodying the principles of the invention, in which a separate motor is used for each wiper blade drive shaft.

A method of arranging the wiper motors to achieve decrease in angular velocity as the wiper blades approach either end of arcuate movement, and at the same time obtain wiper motion up to and including 180°, is illustrated in Fig. 7. As seen therein, each wiper motor 16, having a compound linkage assemblage 19 according to the invention, is arranged for direct drive of a wiper blade crankshaft 14. In effect, the auxiliary motor shaft 23 is directly coupled to a wiper crankshaft 14 so that the increased rotary motion of the auxiliary shaft is transmitted directly to the wiper crankshaft. As a result, it will be seen that when the invention is so applied, a wiper movement having decreased angular velocity at end of stroke relative to angular velocity of the wiper motor will also have a greater arcuate sweep which may be increased as desired, even up to and including 180°. For purpose of controlling the operation of the wiper motors applied to each crankshaft, the control cables 20 are attached to a dual rack and pinion control mechanism 48, which is arranged for convenient manipulation by the vehicle operator.

The foregoing description has been given in detail without thought of limitation since the inventive principles involved are capable of assuming other physical embodiments without departing from the spirit of the invention and the scope of the appended claims.

What is claimed is:
1. A cleaner for a curved windshield having a frontal area merging into a lateral area, comprising in combination therewith, a wiper, a rockshaft journaled adjacent the lower edge of the windshield, a wiper carrying arm on the outer end of the rockshaft and movable thereby form the frontal area out over onto the lateral area and back up the lateral area over onto the frontal area, driving means having a rockable power shaft, and transmission means connecting the power shaft to the rockshaft and including an oscillating driven arm pivoted off-center from the power shaft, and a longer driving arm oscillatable by said power shaft, and a motion transmitting connection between the outer ends of the driving and driven arms, the driving and driven arms in their intermediate position being in substantial registry and the pivot axis of the driven arm being located between the axis of the power shaft and the outer end of the longer arm, and a reciprocatory driving member connecting the outer end of the shorter driven arm to the rockshaft to oscillate the wiper, said motion transmitting connection playing radially on the outer end of the longer driving arm as the latter moves from its intermediate position to carry the wiper over onto and down the lateral area in the direction of airflow to reduce the inertia of the shorter driven arm and the structure connecting the shorter driven arm to the descending wiper at its point of reversal to a minimum at which time the driven arm has a greater angularly displaced position than the longer driving arm.

2. A cleaner according to claim 1, wherein the driving arm underlies the driven arm and is formed with an opening to receive the pivot of the driven arm.

References Cited in the file of this patent

UNITED STATES PATENTS

| | | |
|---|---|---|
| 478,398 | Campbell | July 5, 1892 |
| 2,298,197 | Coffey | Oct. 6, 1942 |
| 2,693,118 | Krohm | Nov. 2, 1954 |
| 2,713,178 | Stocks | July 19, 1955 |
| 2,716,252 | Mackie et al. | Aug. 30, 1955 |
| 2,743,617 | McClelland | May 1, 1956 |
| 2,745,130 | Oishei | May 15, 1956 |
| 2,753,584 | Oishei | July 10, 1956 |